(12) United States Patent
Fauzi et al.

(10) Patent No.: US 6,541,111 B2
(45) Date of Patent: Apr. 1, 2003

(54) PROCESS FOR PRODUCING BORON NITRIDE

(75) Inventors: Faustinus Fauzi, Jakarta (ID); Masato Tani, Tokushima (JP); Masayoshi Suzue, Tokushima (JP)

(73) Assignee: Otsuka Kagaku Kabushiki Kaisha, Osaka (JP)

( * ) Notice: Subject to any disclaimer, the term of this patent is extended or adjusted under 35 U.S.C. 154(b) by 0 days.

(21) Appl. No.: 09/963,549

(22) Filed: Sep. 27, 2001

(65) Prior Publication Data

US 2002/0076557 A1 Jun. 20, 2002

Related U.S. Application Data

(62) Division of application No. 09/242,008, filed as application No. PCT/JP97/02727 on Aug. 6, 1997, now Pat. No. 6,319,602.

(30) Foreign Application Priority Data

| Aug. 29, 1996 | (JP) | ............................................. 8-248751 |
| Aug. 6, 1996 | (JP) | ............................................. 8-224462 |
| Aug. 9, 1996 | (JP) | ............................................. 8-227715 |

(51) Int. Cl.$^7$ .......................... B32B 5/16; C01B 21/064
(52) U.S. Cl. ....................... 428/366; 423/290; 423/409; 428/402; 428/704
(58) Field of Search ................................ 428/366, 402; 428/704; 423/290, 409

(56) References Cited

U.S. PATENT DOCUMENTS

| 4,045,186 | A | * | 8/1977 | Corrigan ...................... 23/295 |
| 4,381,271 | A | * | 4/1983 | Hayden ...................... 264/29.5 |
| 4,495,123 | A | * | 1/1985 | Hunold et al. ................ 264/69 |
| 4,562,050 | A | * | 12/1985 | Koeda et al. ............... 423/290 |
| 4,634,640 | A | * | 1/1987 | Hunold et al. ............... 428/704 |
| 4,749,556 | A | * | 6/1988 | Parrish et al. ............... 423/290 |
| 4,784,978 | A | * | 11/1988 | Ogasawara et al. ........... 501/96 |
| 4,853,196 | A | * | 8/1989 | Koshida et al. ............. 423/290 |
| 4,997,633 | A | * | 3/1991 | Koshida et al. ............. 423/290 |
| 5,004,708 | A | * | 4/1991 | Moore ......................... 501/96 |

(List continued on next page.)

FOREIGN PATENT DOCUMENTS

| EP | 0 432 007 A1 | 6/1991 |

OTHER PUBLICATIONS

Patent Abstract of Japan, Publication No. 01–203205 A, Publication Date Aug. 16, 1989.

(List continued on next page.)

*Primary Examiner*—H. Thi Le
(74) *Attorney, Agent, or Firm*—Kubovcik & Kubovcik

(57) ABSTRACT

The present invention provides a polycrystalline hexagonal boron nitride compound comprising fine crystals of the order of nanometers.

The present invention also provides a hexagonal boron nitride characterized in that the boron nitride is 20 to 200 nm in mean particle size and comprises at least 80 wt. % of particles having sizes in the range of the mean particle size±30%.

The present invention further provides a fine hexagonal boron nitride powder characterized in that the powder comprises particles in the form of circular disks or elliptical disks having a minor axis La, a major axis Lb and a thickness t which satisfy the following expressions.

$50 \text{ nm} \leq La \leq Lb \leq 400 \text{ nm}$ $20 \text{ nm} \leq t \leq 150 \text{ nm}$ $t \leq La$ $0.5 \leq La/Lb \leq 1.0.$

3 Claims, 16 Drawing Sheets

U.S. PATENT DOCUMENTS

| | | | |
|---|---|---|---|
| 5,063,184 A | * 11/1991 | Hagio et al. | 501/96 |
| 5,780,154 A | * 7/1998 | Okano et al. | 428/366 |
| 5,854,155 A | * 12/1998 | Kawasaki et al. | 501/96.4 |
| 5,908,795 A | * 6/1999 | Nishio et al. | 501/96.4 |
| 6,319,602 B1 | * 11/2001 | Fauzi et al. | 428/366 |
| 6,348,179 B1 | * 2/2002 | Paine et al. | 423/277 |

OTHER PUBLICATIONS

Patent Abstract of Japan, Publication No. 01–176208 A, Publication Date Jul. 12, 1989.

Patent Abstract of Japan, Publication No. 08–290905 A, Publication Date Nov. 5, 1996.

Patent Abstract of Japan, Publication No. 01–124625 A, Publication Date May 17, 1989.

* cited by examiner

PROCESS FOR PRODUCING BORON NITRIDE

This application is a division of application Ser. No. 09/242,008, filed Feb. 5, 1999, now U.S. Pat. No. 6,319,602 which is a 371 of PCT/JP97/02727 filed Aug. 6, 1997.

TECHNICAL FIELD

The present invention relates to hexagonal boron nitride (hereinafter referred to as "h-BN") polycrystalline compounds comprising fine crystals and processes for producing the same.

The invention relates also to h-BN and a process for producing the same.

The invention further relates to h-BN comprising fine particles of novel anisotropic shape and a process for producing the same. h-BN has found a wide variety of industrial uses in lubricating materials, high-temperature structural materials, molten metal containers, insulating heat sink plates, tool materials of high hardness, etc.

BACKGROUND ART h-BN has a structure resembling that of graphite and comprising planar reticular hexagonal B-N arrangements as stacked, and is known as a compound which is outstanding in characteristics such as thermal conductivity, electrical insulating properties, heat resistance, corrosion resistance, chemical stability and lubricity. Active efforts are directed to the development of uses of this compound. To utilize these characteristics, h-BN is used in various fields in the form of a powder as a solid lubricant, heat-resistant parting agent and material for cubic BN (c-BN), or in the form of sintered bodies prepared from a powder thereof and serving as melting crucibles, electric insulating materials and electronic materials.

Attention has been directed in recent years to the heat resistance and heat dissipating property of the compound in the field of electric and electronic components, and further applications are expected to heat sink plates, for example, for use in computers.

The industrial processes already known for producing boron nitride includes: 1) process for nitriding a boron oxide by reduction, 2) process for nitriding elemental boron, and 3) process for nitriding a boron halide by reduction. The h-BN obtained by these processes has a scalelike form attributable to the particular process and is therefore subject to limitations when to be made into sintered bodies or into composite materials in combination with other ceramics or when to be used in the form of other composite materials. More specifically, the use of the scalelike h-BN as a material for sintered bodies inevitably involves formation of voids and consequently encounters difficulty in giving a compacted sintered body. The nitride has the drawback of giving rise to a similar problem also when to be made into composite materials along with other ceramics or resins.

On the other hand, JP-A-151202/1985 discloses a process for producing a boron nitride. According to the publication, a boron nitride in a scalelike, columnar or acicular form can be obtained from at least one boron compound selected from among boric acids and metal salts of boric acids, and at least one nitrogen-containing compound capable of reacting with the boron compound, by forming a compound first wherein boron and nitrogen atoms are conjointly present, and subsequently heating the resulting compound in an inert gas or reducing gas atmosphere at a temperature of at least 600° C.

However the fibrous boron nitride available by this process is limited to not greater than 20 $\mu$m in fiber length if longest and still remains to be fully improved in size for use as a material for giving improved thermal conductivity.

The boron nitride obtained by this process is not in the form of fine particles of high quality on the order of nanometers, and can not be made into fine crystals of the order of nanometers even if pulverized.

A first object of the present invention is to provide a polycrystalline h-BN compound comprising fine crystals of the order of nanometers or a polycrystalline h-BN compound having a fibrous form, and a process for producing such a compound.

DISCLOSURE OF THE INVENTION

The present invention provides as a first feature thereof a polycrystalline h-BN compound comprising fine crystals of the order of nanometers and a polycrystalline h-BN compound having a fibrous form.

The invention further provides a process for producing a polycrystalline h-BN compound comprising fine crystals of the order of nanometers or a polycrystalline h-BN compound having a fibrous form which process is characterized by heat-treating a fibrous compound represented by the formula $C_3N_6H_{12}B_2O_6$ in a nonoxidizing atmosphere at a temperature of 1300 to 1800° C.

The polycrystalline h-BN compound of the present invention comprises fine crystals of the order of nanometers. These fine crystals are in the range of 20 to 200 nm (nanometers), preferably 50 to 200 nm, in particle size, and 5 to 50 nm in average thickness. The polycrytalline h-BN compound of the invention is preferably at least 30 $\mu$m to not greater than 5 mm in length.

The first feature of the invention will be described below.

In developing uses of functional fibrous compounds so far proposed by us, we conducted intensive research from the viewpoint that an increase in apparent volume fraction of a filler as incorporated in composite materials requires an increase in the size of the filler fibers, and consequently found that crystalline fibrous $C_3N_6H_{12}B_2O_6$ (compound) of high quality can be prepared by a simple process as a precursor of boron nitride (compound).

The fibrous compound having the composition of the formula $C_3N_6H_{12}B_2O_6$ is obtained by reacting a melamine compound with a boric acid or boron oxide in a suitable solvent with heating, cooling the reaction mixture to effect growth of crystals, filtering off a fibrous compound separating out and drying the compound preferably rapidly. The compound has a single-crystal structure which belongs to the monoclinic system and wherein the lattice constants are substantially a=3.600 Å, b=20.143 Å, c=14.121 Å and $\beta$=92.11°.

A single-crystal automatic X-ray structural analysis has revealed that this starting material has the following crystal structure.

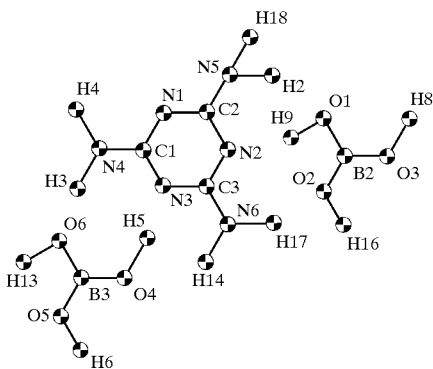

The compound is useful as an intermediate of boron nitrides and various boron nitride compounds. The compound may contain small amounts of compounds having a structure other than the above crystal structure.

The fibrous compound having the composition of the formula $C_3N_6H_{12}B_2O_6$ can be about 30 µm to about 5 mm in average fiber length depending on the reaction conditions. The compound is about 10 to about 50 in average aspect ratio.

The present invention provides a process for producing a polycrystalline h-BN compound comprising fine crystals of the order of nanometers by heat-treating the compound having the composition of the formula $C_3N_6H_{12}B_2O_6$ in a nonoxidizing atmosphere.

Usable as the melamine compound in preparing the starting material of the invention is a compound having an $NH_2$ group such as melamine, ammeline, ammelide, melam or mellon. Usable as the boric acid is orthoboric acid, metaboric acid or tetraboric acid, and as the boron oxide is boron trioxide, diboron dioxide, tetraboron trioxide or tetraboron pentoxide. The boric acid or boron oxide, and the melamine compound are heated individually or together in a solvent and dissolved completely, following by cooling to cause molecular crystals to separate out, with two moles of boric acid combined with one mole of melamine compound by a hydrogen bond. The growth of these crystals affords the starting compound (precursor compound) for use in the invention. When the boric acid and the melamine compound are dissolved each singly, it is necessary to mix the boric acid solution and the melamine compound solution together to obtain the starting compound of the invention. It is desired that the two solutions be mixed together in such predetermined amounts that the mixture has a boric acid/melamine compound molar ratio of 2/1. The starting compound of the invention can be obtained even if an excess of boric acid or melamine compound is present, whereas it is then likely that the reaction mixture will have dissolved therein an amount of boric acid or melamine compound in excess of the solubility at the cooling temperature. In this case, the excessive acid or compound is caused to crystallizes out again (particulate), and the starting compound of the invention obtained after filtration and rapid drying is in the form of a mixture of a fibrous compound and particles. Although the melamine compound disappears on decomposition when the starting compound is heat-treated for conversion into h-BN, the boric acid remains as an impurity for the starting compound of the invention which is thought to be a particulate h-BN or acid nitride. From the viewpoint of effective use of the materials, it is desirable to dissolve the acid and compound in calculated specified amounts in practicing the present invention.

According to the present invention, it is essentially required to subject the boric acid and the melamine compound to an addition reaction by heating although the reaction mechanism still remains to be clarified. When the reaction mixture is cooled from the reaction temperature, crystals grow to give the starting compound of the invention. As a feature of the invention, the fiber length of the compound to be obtained can be controlled by varying the reaction temperature. Further unlike the prior art, the process for preparing the precursor for use in the invention affords an acicular compound even when the solvent is a completely aqueous system. It is desired that the reaction temperature be below the boiling point of the solvent when the starting compound of the invention to be obtained is of the order of µm in fiber length, and that the reaction temperature be at least the boiling point of the solvent to 200° C. when the compound to be obtained is of the order of millimeters in fiber length. Heating temperatures below 60° C. are undesirable since the compound is then obtained in shorter fiber lengths with a lower production efficiency. The hydrothermal preparation of the compound at a temperature of higher than 200° C. requires an increased equipment cost and is likely to give coarser crystals (of abnormal growth), so that temperatures up to 200° C. are desirable for stable production. Although the reaction time at a particular temperature determined is not limited specifically, it is desired that the materials be completely dissolved in practicing the invention. If the cooling temperature is lowered at an excessively high rate, the growth of fibers and the crystallinity of fibers will be adversely affected, whereas too small a cooling rate will entail lower productivity, so that it is desirable to determine a suitable cooling rate within a range not objectionable to the use of the resulting compound as the starting material of the invention. The crystals obtained are separated from the solvent by filtration in the usual manner.

Another important step in preparing the precursor for use in the invention is to rapidly dry the resulting fibrous precursor compound, for example, in a vacuum or at a reduced pressure so as to obtain a dry product retaining, to the greatest possible extent, the fibrous shape as prepared. Although the limit on how high the solvent drying rate can be is dependent on the drying temperature, capacity of the dryer, etc. and can not be determined specifically, the higher the drying rate, the better is the shape retentivity.

It is not desirable to dry the precursor compound at too low a rate and at an elevated temperature because a non-crystalline C—H—N—B—O type compound is then obtained which is collapsed in shape due to a phenomenon thought to be remelting of acicular crystals prepared and which fails to give the desired product of the invention even if heated.

Stated briefly, the precursor compound is prepared by completely dissolving a boric acid or boron oxide and a melamine compound in a solvent with heating, subjecting the solution to an addition reaction, cooling the resulting mixture to separate out a fibrous product in the form of crystals grown in the direction of a-axis and rapidly drying the product to obtain a single-crystal compound. The desired compound of the present invention is obtained by heat-treating the precursor compound at a temperature of 1300 to 1800° C., preferably 1300 to 1500° C., in a nonoxidizing atmosphere. The term "nonoxidizing atmosphere" refers to an atmosphere of argon, helium, nitrogen or ammonia gas which is free from oxygen or wherein oxidation is unlikely to occur. If the heat-treating temperature is below 1300° C., the precursor compound partly becomes amorphous or t-BN, failing to give homogeneous h-BN, whereas temperatures over 1800° C. are undesirable since the resulting product has an altered shape, failing to retain the shape. The treating time is usually 15 minutes to 24 hours, preferably 1 to 6 hours. A reaction time of less than 15 minutes is undesirable because of the possibility of an incomplete reaction. It is likely that a compound $C_3NH_{12-2x}B_2O_{6-x}$, analogous to the precursor compound, will be obtained which corresponds to the composition of the formula $C_3N_6H_{12}B_2O_6$ from which water $xH_2O$ (0<x<6) is removed by the rapid drying step. This compound is included also in the material of the invention insofar as it retains a fibrous shape. The precursor compound has satisfactory crystallinity, which makes it possible to prepare an h-BN compound at a lower temperature than conventionally, the h-BN compound being fibrous and in the form of agglomerates of fine crystals retaining the fibrous shape of the precursor.

The polycrystalline h-BN compound comprising fine crystals of the order of nanometers and produced by the process of the invention is in the form of fibers, while this compound having its fibrous shape collapsed as by pulverization is also useful as a finely crystalline h-BN material and is included in this invention. Usable for pulverization are, for example, an attritor, ball mill, wet mill or like pulverizer. The pulverized compound is in the form of very fine crystals of the order of nanometers, is highly uniform in size, therefore has excellent sinterability and is extremely useful in industries, for example, as a material for sintered bodies.

When the present compound is, to be made into a composite material, for example, along with a resin and thereby given improved thermal conductivity, the advantage of the compound that it is fibrous achieves an improvement in apparent volume fraction. Further when the compound of the invention is to be used as a material for giving sintered bodies, pulverization of the compound affords primary h-BN particles of the order of nonometers. The compound provided is industrially useful, for example, because the primary particles are fine crystals of the order of nonometers and accordingly have excellent sinterability.

The polycrystalline h-BN compound of the invention comprising fine crystals of the order of nanometers and in the form of fibers achieves an improvement in apparent volume fraction because of its advantage of being fibrous and is useful especially as a thermal conductivity improving material. Further the fibrous polycrystalline h-BN compound obtained by the process of the invention and comprising fine crystals has the feature that the direction of a normal to the reticular plane of fine crystals approximately matches the longitudinal direction of the fibers. Accordingly, when a blend of such fibers and a resin is extruded into a sheet or plate with the fibers oriented in the direction of extrusion, the plate has remarkably improved thermal conductivity in the direction of its thickness and is useful as an excellent heat dissipating material.

Next, a second feature of the invention will be described.

When to be improved in insulating properties and heat dissipating properties, h-BN needs to be higher in purity. Further it is desired that h-BN for use as a molding material be in the form of fine particles of uniform size so as to exhibit improved sinterability. However, no process has been known for preparing at a low cost and with ease h-BN which is satisfactory in these characteristics.

Conventionally h-BN is industrially produced by a reductive nitriding process wherein a boron compound such as a boric acid or borax and a nitrogen-containing compound such as melamine, urea or dicyandiamide are heated in an atmosphere of nonoxidizing gas such as ammonia gas. The powder obtained by this process is called crude h-BN, which is as low as about 70 to 90 wt. % in purity, has low crystallinity, exhibits broad peaks when checked by powder X-ray diffraction and crystallographically belongs to boron nitride of turbulent structure (t-NB). The powder is low in water resistance and in stability in the atmosphere and is not satisfactory in insulating properties and heat dissipating properties.

h-BN having a high purity of at least 98 wt. % is prepared from the crude h-BN usually by heating the crude nitride at 1700 to 2100° C. in a nonoxidizing gas atmosphere of nitrogen or argon to remove the impurities. This treatment results in the progress of crystallization, affording a product of improved crystallinity and purity, whereas the product is in the form of 3 to 5 $\mu$m scales and therefore has unsatisfactory sinterability, failing to give compact sintered bodies. Further for use as a filler for resins and metals, the product has the drawback of failing to achieve a high volume fraction. Additionally the process has the drawback of necessitating a high-temperature treatment and accordingly being costly.

As a process for producing a fine boron nitride powder of high purity, on the other hand, a process has been proposed which comprises adding a carbonaceous powder to crude h-BN and heat-treating the mixture at not lower than 1500° C. in ammonia gas to prepare particles up to 0.5 $\mu$m in size (JP-A-256905/1986). However, the process still remains to be fully improved because of the difficulty encountered in uniformly adding the carbonaceous powder on an industrial scale, also because it is desired that although uniform in size and fine unlike the conventional product, the product be made finer, for example, for use as a material for sintered bodies, and further because the necessity for high-temperature heating entails a high production cost.

Also known is a method of giving a higher purity by thoroughly washing the material in the initial stage (JP-A-80308/1990 and JP-A-115109/1991). Nevertheless, the fine particles obtained by this method are merely boron nitride of low crystallinity or turbulent structure, and require heating at a high temperature of at least 1500° C. when to be made into h-BN of high crystallinity, whereas the heating step impairs the fineness of the crystals.

A second object of the present invention is to provide a powder of fine h-BN crystals having a high purity and high crystallinity, and a simple process for producing the powder at a low cost.

The invention provides as a second feature thereof an h-BN characterized in that the h-BN is 20 to 200 nm in mean particle size and comprises at least 80 wt. % of particles having sizes in the range of the mean particle size±30%.

The h-BN of the invention has high purity and high crystallinity and exhibits an X-ray diffraction pattern wherein (002) plane peaks (c-axis lattice constants) are in the range of 3.33 to 3.36 ÅA, and (102) plane peaks appear at an intensity ratio of 3% or more relative to the (002) plane peaks.

The present invention further provides a process for producing an h-BN characterized by admixing a carbonate, sulfate or nitrate of an alkali metal or alkaline earth metal with a boron-containing compound and a nitrogen-containing compound, and heating the mixture in a nonoxidizing gas atmosphere at 1000° C. to 1500° C.

The h-BN provided by the invention is 20 to 200 nm, preferably 40 to 80 nm, in mean particle size, comprises such fine particles that at least 80 wt. % thereof have sizes in the range of the mean particle size±30%, and has high purity and high crystallinity. The compound is therefore a very useful material which is excellent in insulating properties, thermal conductivity, lubricity and sinterability.

In preparing the h-BN of the invention, a carbonate, sulfate or nitrate of an alkali metal or alkaline earth metal is first admixed with a boron-containing compound and a nitrogen-containing compound.

Examples of boron-containing compounds useful for the invention are boric acids such as orthoboric acid, metaboric acid and tetraboric acid, boron oxides such as diboron trioxide, diboron dioxide, tetraboron trioxide and tetraboron pentoxide, boron chlorides such as boron trichloride, borax (sodium borate), ammonium borate, diborane, potassium borofluoride, etc. At least two of these compounds may be used in combination.

Examples of nitrogen-containing compounds useful for the invention are compounds such as melamine, ammeline, ammelide, melam, mellon, dicyandiamide and urea, among which melamine is desirable. At least two of these compounds may be used in combination.

Examples of carbonates, sulfates or nitrates of alkali metals or alkaline earth metals are carbonates, sulfates or nitrates of potassium, sodium, lithium, barium, strontium, calcium, etc., among which desirable are carbonates of alkali metals, especially potassium carbonate and sodium carbonate. At least two of these compounds may be used in combination.

The mixing ratio of the boron-containing compound to the nitrogen-containing compound is about 1:10 to about 10:1, preferably about 1:2 to about 2:1, more preferably 1:1 in terms of the boron/nitrogen molar ratio. It is suitable to use the alkali metal or alkaline earth metal carbonate, sulfate or nitrate in an amount of about 0.01 to about 3 parts by weight, preferably about 0.1 to about 0.5 part by weight per part by weight of the combined amount of the boron-containing compound and the nitrogen-containing compound. The compounds are mixed together using, for example, a Henschel mixer or supermixer.

The mixture obtained is heated in a nonoxidizing gas atmosphere at a temperature of 1000° C. to 1500° C., preferably 1000° C. to 1200° C., for about 15 minutes to about 24 hours, preferably for 1 to about 6 hours, whereby an h-BN of the invention can be prepared. Examples of nonoxidizing gas atmospheres are those of nitrogen gas, argon gas and ammonia gas. If the heating temperature is lower than 1000° C., it is likely that the product is insufficient in crystallinity or purity and undesirable. Even if the heating temperature is over 1500° C., the h-BN of the invention is available, but an economical disadvantage will then result.

The h-BN obtained may be washed with water or a dilute acid such as dilute hydrochloric acid to remove alkali metal ions or alkaline earth metal ions.

The mechanism through which a very fine h-BN of high purity and high crystallinity can be obtained by the present invention still remains to be fully clarified, we consider that the nitride is produced by the following combination of actions.

First, the carbon dioxide gas or ammonia gas evolved by the alkali metal carbonate or the like during the heating reaction provides divided reaction sites on the order of nanometers, suppressing the development of planar reticular B-N arrangements.

Second, the smaller the planar reticular B-N arrangements in area, the greater is the likelihood that these arrangements will be stacked or ordered at a low temperature. Third, the alkali metal or alkaline earth metal becomes a borate, which acts as an agent for promoting interlayer order. Through these actions, uniform fine h-BN particles of high purity heretofore unavailable can be produced by heating at lower temperature according to the invention.

Next, a third feature of the invention will be described.

To enable the h-BN described to exhibit the required characteristics, it is desired that the compound, for example, as a powder have high purity so as to be improved in insulating and heat dissipating properties, and that the compound as a material for moldings be in the form of fine particles of uniform size so as to be improved in sinterability. However, a process has yet to be developed for preparing such uniform fine h-BN particles of high purity by heating at a low temperature as described with reference to the prior art of the first feature of the invention.

A third object of the present invention is to provide an h-BN powder comprising fine crystal particles having a novel shape and high purity and a process for producing the powder.

The present invention provides as the third feature thereof a fine hexagonal boron nitride powder comprising particles in the form of circular disks or elliptical disks having a minor axis La, a major axis Lb and a thickness t which satisfy the following expressions.

$$50 \text{ nm} \leq La \leq Lb \leq 400 \text{ nm}$$

$$20 \text{ nm } 6 \leq t \leq 150 \text{ nm}$$

$$t \leq La$$

$$0.5 \leq La/Lb \leq 1.0$$

The invention further provides an h-BN powder comprising fine particles in the form of elliptical disks or circular disks and characterized in that planar reticular hexagonal B-N arrangements are stacked in the direction of thickness thereof.

The invention further provides a process for producing an h-BN powder comprising particles in the form of elliptical disks or circular disks, the process being characterized by heat-treating a fibrous compound containing boron and nitrogen in a nonoxidizing gas atmosphere at a temperature of 400 to 800° C., pulverizing the resulting product and thereafter heat-treating the pulverized product in a nonoxidizing gas atmosphere at a temperature of 1000 to 1800° C.

The h-BN provided by the invention comprises uniform fine particles of novel anisotropic shape and is therefore a highly useful material which is excellent in insulating properties, thermal conductivity, lubricity and sinterability.

In developing uses of functional fibrous compounds we have so far proposed, we have conducted intensive research from the viewpoint that the filler in composite materials needs to have a fibrous shape of increased size when to be increased in apparent volume fraction. Consequently we have previously found that crystalline fibrous $C_3N_6H_{12}B_2O_6$ (compound) of high quality can be prepared as a precursor of boron nitride (compound) by a simple process as already described with reference to the first feature of the invention.

The fibrous compound having the composition of the formula $C_3N_6H_{12}B_2O_6$ is a compound useful as an intermediate of boron nitride and various boron nitride compounds as previously described. The compound may contain a small amount of compound having a structure other than the crystal structure described.

The fibrous compound having the composition of the formula $C_3N_6H_{12}B_2O_6$ can be about 30 $\mu$m to about 5 mm in average fiber length depending on the reaction conditions. The average aspect ratio of the compound is about 10 to about 50.

According to the invention, the desired h-BN in the form of fine particles of anisotropic shape is prepared by heat-treating the compound having the composition of $C_3N_6H_{12}B_2O_6$ in a nonoxidizing gas atmosphere to obtain t-BN retaining the fibrous form and subsequently heat-treating the product, as pulverized, at a low temperature in a nonoxidizing gas atmosphere.

The process for preparing the compound having the composition $C_3N_6H_{12}B_2O_6$ and useful as the starting material is the same as is the case with the first feature of the invention.

The fibrous h-BN precursor obtained is heated in a nonoxidizing gas atmosphere at a temperature of 400 to 800° C. for 0.5 to 5 hours, preferably for 1 to 3 hours, whereby t-BN can be prepared. Examples of nonoxidizing gas atmospheres usable are those of nitrogen gas, argon gas and ammonia gas. The heating temperature of 400 to 800° C. gives no scalelike product, permitting the product to retain the original fibrous form. The fibrous product is then fully pulverized as by a ball mill for at least 0.5 hour, preferably for at least 2 hours. In this stage, the t-BN produced by a reaction in a region of the order of nanometers retains an acicular form with a small bond strength and is therefore very easy to pulverize, affording a uniform t-BN powder. Stated repeatedly, it is not a mere amorphous precursor but acicular precursor particles of uniform size that are pulverized in this stage as an important requirement. The powder obtained is subsequently heated in a nonoxidizing gas atmosphere at a temperature of 1000 to 1800° C. for 0.5 to 5 hours, preferably for 1 to 3 hours. Although the change from t-BN to h-BN is usually effected at a high temperature (about 1800 to about 2200° C.), the change of uniform fine t-BN proceeds at a low temperature (at least 1000° C.). Because the transition from t-BN to h-BN is ordering of disturbed layers effected in a group of planar reticular B-N arrangements, the smaller the area of planar reticular arrangements, the easier the layer-to-layer ordering. Since the particles are fine, the t-BN has an increased surface area and is amenable to an efficient reaction at low temperatures. Because the t-BN is not heated excessively, growth of particles at a high temperature is avoidable to give a fine h-BN powder.

As described above, the present invention provides a fine h-BN powder comprising particles of specific form heretofore unavailable, i.e., in the form of elliptical disks or circular disks, and a process for producing the powder. The product of the invention is usable not only as a lubricant as in Examples but also for various applications to produce unprecedented effects. For example, when to be used in combination with a resin to provide a composite material for use as a thermally conductive material, the product of the invention can be incorporated in a greater proportion, giving a resin composite of high thermal conductivity although the conventional scalelike h-BN is difficult to knead with resin and can not be incorporated into a composite material in a great proportion, consequently failing to give satisfactory thermal conductivity to the composite. The product can be sintered easily as mixed with other ceramic particles to afford a ceramic composite material having lubricity imparted thereto. The conventional scalelike h-BN becomes oriented when pressed hot in producing molded articles, whereas the product of the invention is usable for giving isotropic compact molded articles. When used as a material for c-BN, the product can be converted to c-BN at a higher ratio than the conventional scalelike h-BN.

BEST MODE OF CARRYING OUT THE INVENTION

The present invention will be described below in greater detail with reference to examples.

EXAMPLE A1

Figure 1:
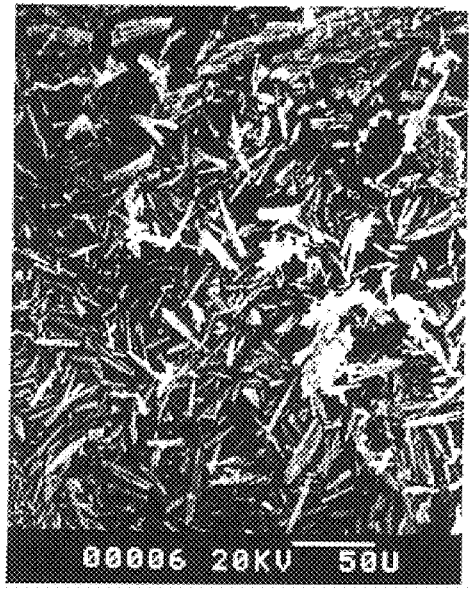
FIG. 1 is a SEM photograph showing the shape of a fibrous precursor compound obtained in Example A1.
Figure 2:
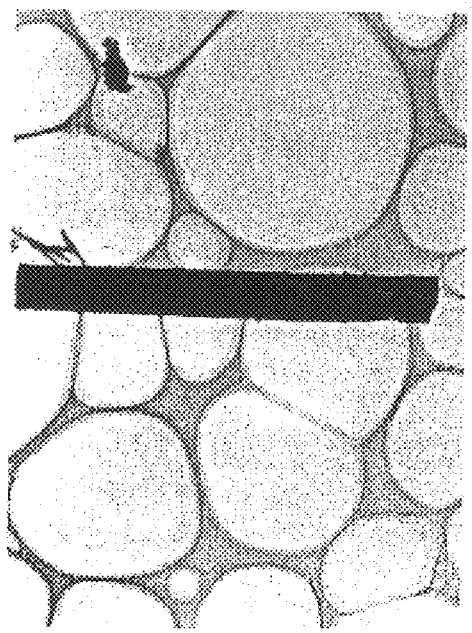
FIG. 2 is a TEM photograph showing the shape of the fibrous precursor compound obtained in Example A1.
Figure 3:
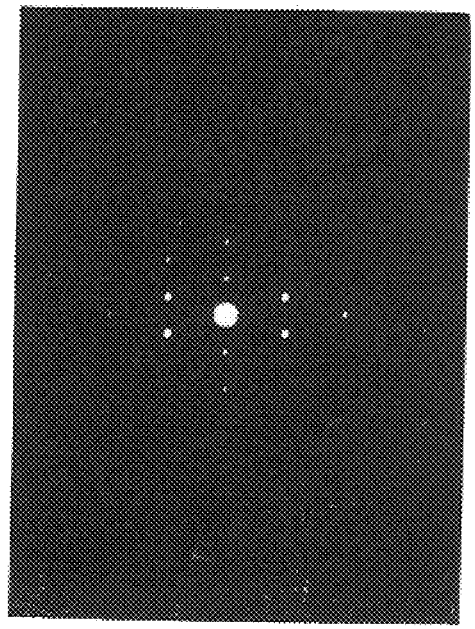
FIG. 3 is a TEM electron beam diffraction photograph showing a single crystal of the fibrous precursor compound obtained in Example A1.
Figure 4:
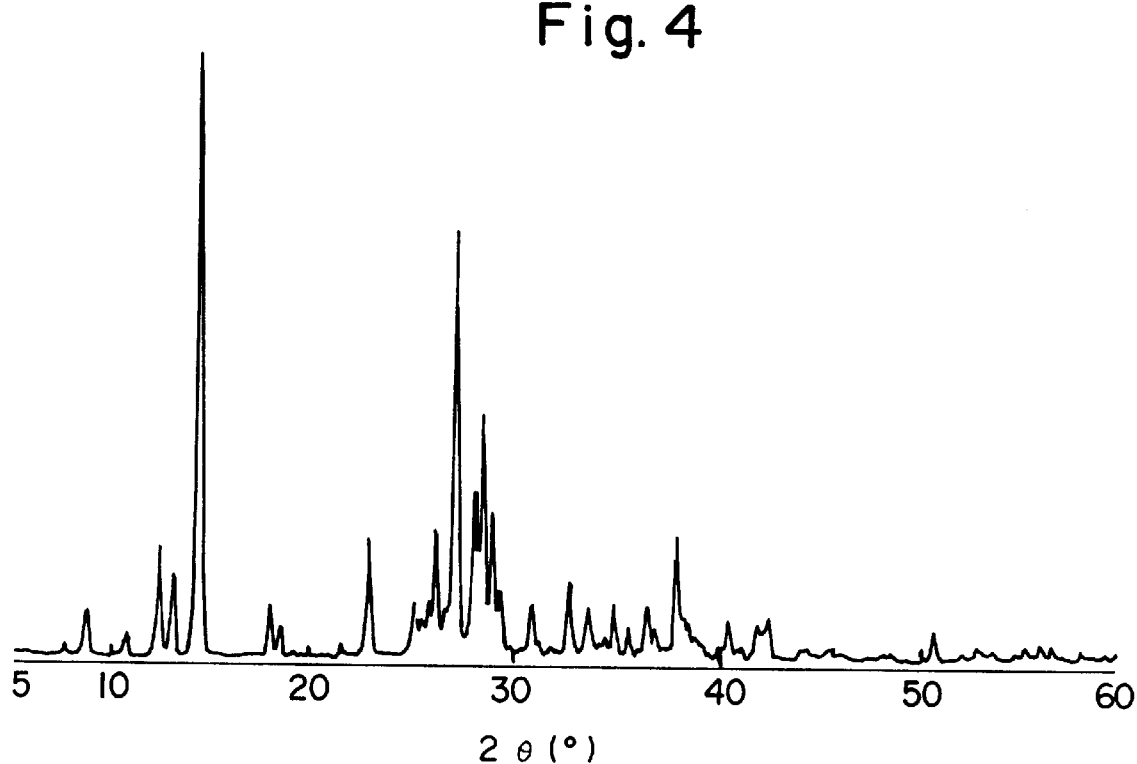
FIG. 4 is an XRD diffraction chart of the fibrous precursor compound obtained in Example A1.
Figure 5:
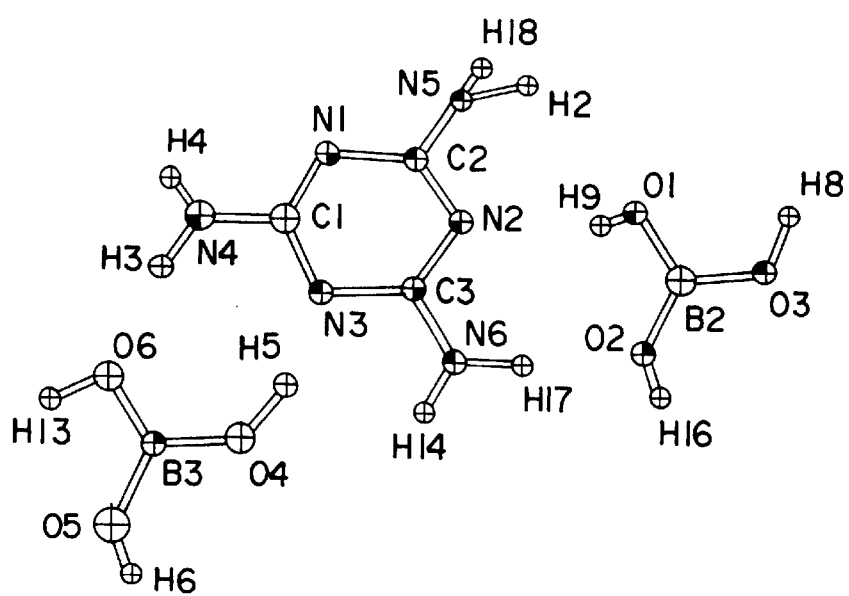
FIG. 5 is a chart showing the crystal structure, as determined by a single-crystal automatic X-ray structural analysis, of the fibrous precursor compound obtained in Example A1.

A 400-ml quantity of deionized water was placed into a 500-ml glass beaker, 12 g of melamine was further placed in, and the mixture was heated to 80° C. with stirring to prepare a complete solution. Orthoboric acid (15 g) was uniformly dissolved in the solution for reaction, followed by slow cooling to room temperature to produce a fibrous compound. The compound was filtered off and then dried in a vacuum at 50° C. The fibrous compound was obtained in an amount of 24 g and had an average fiber length of 60 µm. CHN analysis, B analysis by high-frequency induction coupling plasma luminescence (ICP) and single-crystal automatic X-ray structural analyzer [AFC/RASA-7R, product of Rigaku Denki Co., Ltd.] revealed that the compound was of the single crystal type and had the composition $C_3N_6H_{12}B_2O_6$ wherein two moles of the boric acid was combined with one mole of melamine. TEM electron beam diffraction also indicated that the compound was composed of a single crystal. FIG. 1 is a photograph of the fibrous precursor compound obtained, taken under a scanning electron microscope (SEM), FIG. 2 is a photograph of the same taken under a transmission electron microscope (TEM), FIG. 3 is a TEM electron beam diffraction photograph of the same, FIG. 4 is an X-ray diffraction (XRD) chart of the same, and FIG. 5 is a chart showing the crystal structure of the same as determined by single-crystal automatic X-ray structural analysis.

Figure 6:
FIG. 6 is a SEM photograph showing the shape of the desired fibrous compound obtained in Example A1.
Figure 7:
FIG. 7 is a TEM photograph showing the shape of the desried fibrous compound obtained in Example A1.

Subsequently, the fibrous compound was heat-treated in a nitrogen atmosphere at 1400° C. for 1 hour. The compound obtained was found to be a single compound of h-BN when analyzed by XRD, to be a fibrous polycrystalline compound retaining the shape of the precursor when observed under SEM and to be a collection of fine crystals, 60 nm in particle size and 17 nm in average thickness, when observed under TEM. Thus a compound of the invention was obtained. FIG. 6 is a SEM photograph of the desired fibrous compound of the invention obtained, and FIG. 7 is a TEM photograph of the same.

EXAMPLE A2

The same procedure as in Example A1 was performed at a heating temperature of 1300° C. When analyzed in the same manner as in Example A1, the compound obtained was found to be identical with the compound of Example A1.

EXAMPLE A3

The same procedure as in Example A1 was performed at a heating temperature of 1800° C. When analyzed in the same manner as in Example A1, the compound obtained was found to be identical with the compound of Example A1.

EXAMPLE A4

Figure 8:
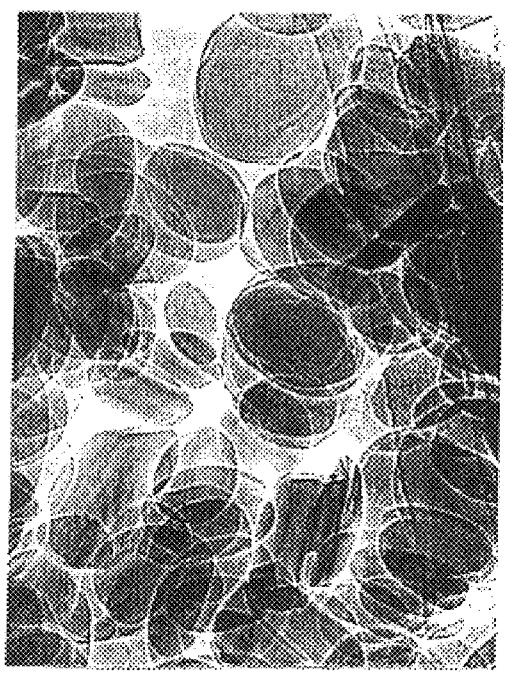
FIG. 8 is a TEM photograph showing the shape of fine crystals obtained in Example A4.

The fibrous polycrystalline compound obtained in Example A1 was treated in a wet pulverizer of the media agitation type (product of Mitsui Mining Co., Ltd.) for 5 hours, and the resulting slurry was filtered, followed by drying. When observed under TEM, the product obtained was fine crystals which were almost wholly up to 100 nm in size. FIG. 8 is a TEM photograph of fine crystals obtained.

EXAMPLE A5

A composition comprising 40 wt. % of the compound obtained in Example A1 in PPS resin was fed to an injection molding machine to prepare a molding, which was found to be 2 W/mK in thermal conductivity when checked by the laser flash method.

Comparative Example A1

Figure 9:
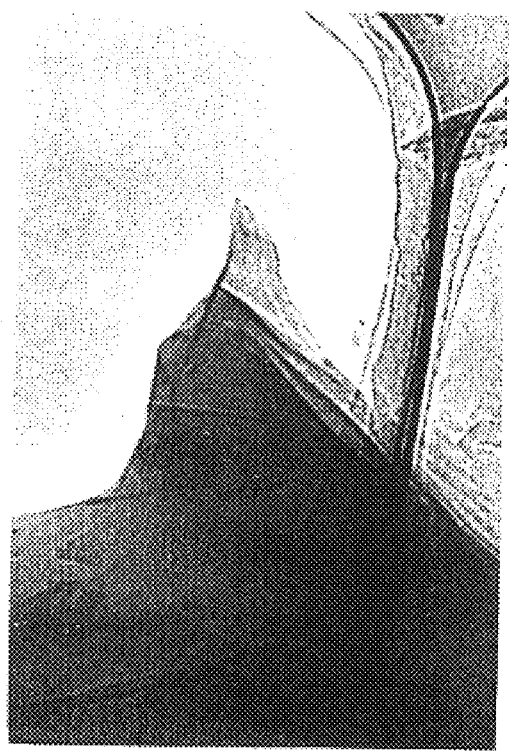
FIG. 9 is a TEM photograph showing the shape of a commercial h-BN.

A composition comprising 40 wt. % of a commercial h-BN in PPS resin was made into a molding sample in the same manner as in Example A5. The sample was found to be 1.5 W/mK in thermal conductivity when checked in the same manner as in Example A5. FIG. 9 is a TEM photograph of the commercial h-BN.

EXAMPLE B1

Figure 10:
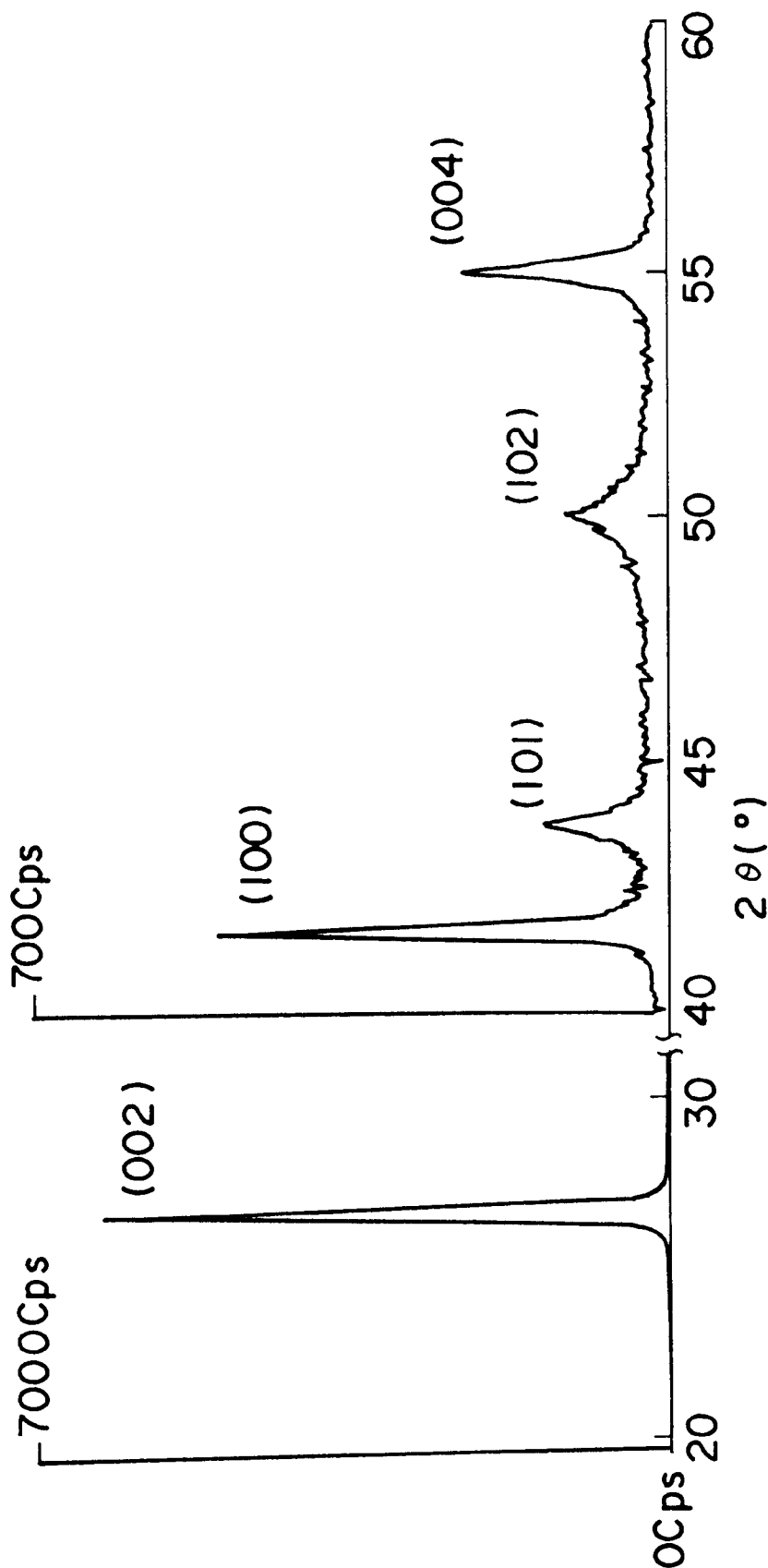
FIG. 10 is an X-ray diffraction chart of an h-BN obtained in Example B1.
Figure 11:
FIG. 11 is a TEM photograph of the h-BN obtained in Example B1.
Figure 12:
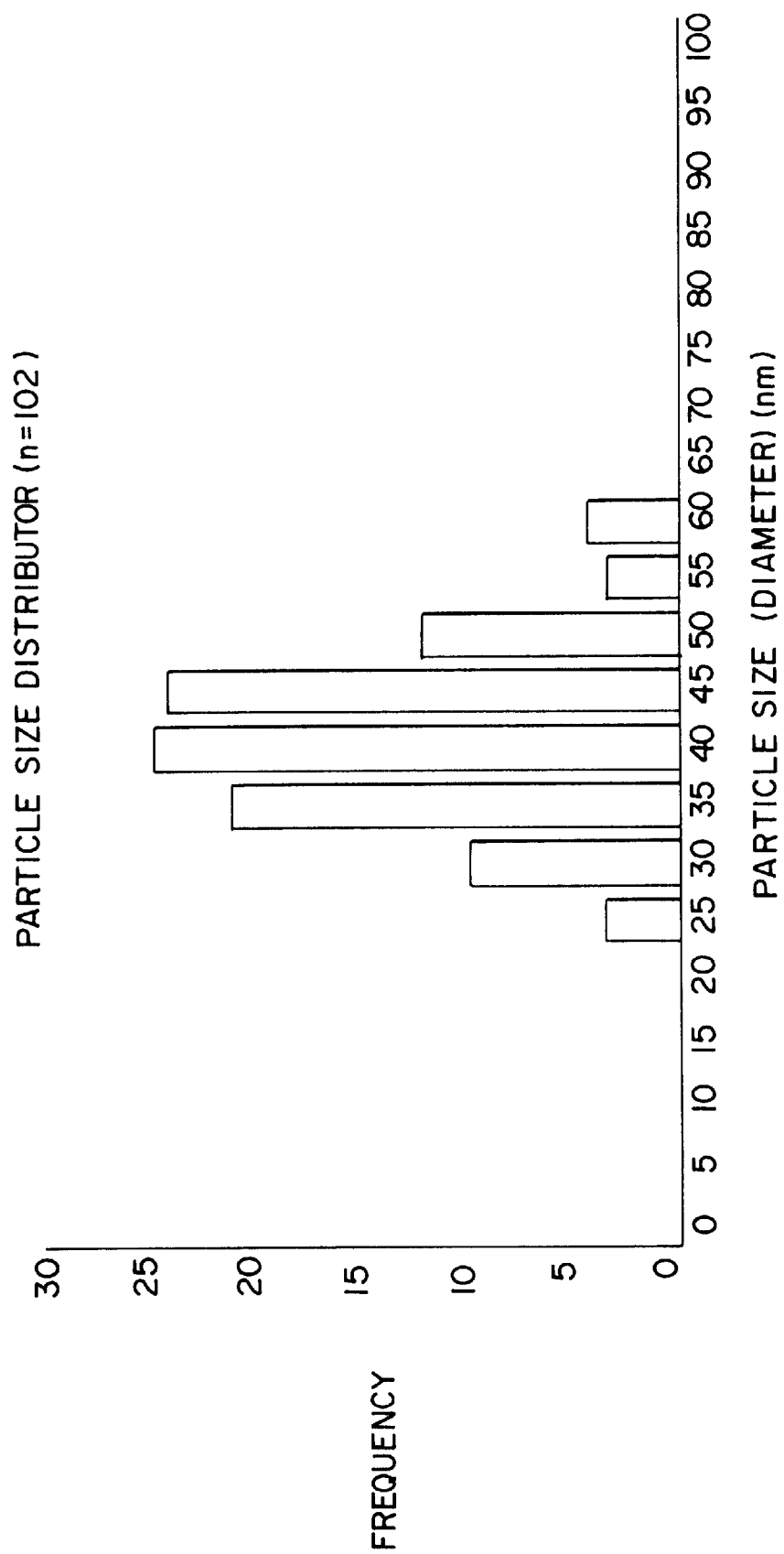
FIG. 12 is a graph showing the particle size distribution of the h-BN obtained in Example B1.

Melamine, orthoboric acid and potassium carbonate were mixed together in a weight ratio of 1:1:0.5, heat-treated in a nitrogen atmosphere at 1200° C. for 2 hours, allowed to cool and thereafter cooled and dried in hot water. The compound obtained was a white powder comprising uniform particles which were 99.5% in purity, 43.74 nm in mean size and 7.39 nm in standard deviation (17% of the mean). The product was an h-BN of high crystallinity having a sharp (002) plane peak and a distinct (102) plane peak as seen in FIG. 10 which is an X-ray diffraction chart of the product. In FIG. 10, the target was Cu, λ=2d sin θ, λ=1.54 Å, and the (002) plane peak was 3.34 Å. The crystallite size Lc was at least 2000 Å. FIG. 11 is a TEM photograph of the h-BN powder, and FIG. 12 shows the particle size distribution of the h-BN powder.

EXAMPLE B2

A uniform highly crystalline h-BN was prepared in the same manner as in Example B1 except that the potassium carbonate was replaced by sodium carbonate. The product was 99.3% in purity, 61.5 nm in mean particle size and 11.6 nm in standard deviation (19% of the mean).

EXAMPLE B3

A highly crystalline h-BN was prepared in the same manner as in Example B1 except that the potassium carbonate was replaced by calcium carbonate. The product was 99.2% in purity, 67.9 nm in mean particle size and 15.4 nm in standard deviation (23% of the mean).

EXAMPLE B4

The h-BN powder obtained in Example B1 and serving as a filler was mixed with PPS (polyphenylene sulfide) resin in a Henschel mixer for 3 minutes, and the mixture was thereafter kneaded for experiment by a kneader-extruder (300° C., 60 rpm) having two screws 30 mm in diameter and rotatable in the same direction. Consequently, it was found possible to incorporate the filler into the resin with a volume fraction of up to 60 wt. %. When checked by the laser flash method, the sample obtained with the volume fraction of 60 wt. % was 2.5 W/m·K in thermal conductivity.

Comparative Example B1

Figure 13:
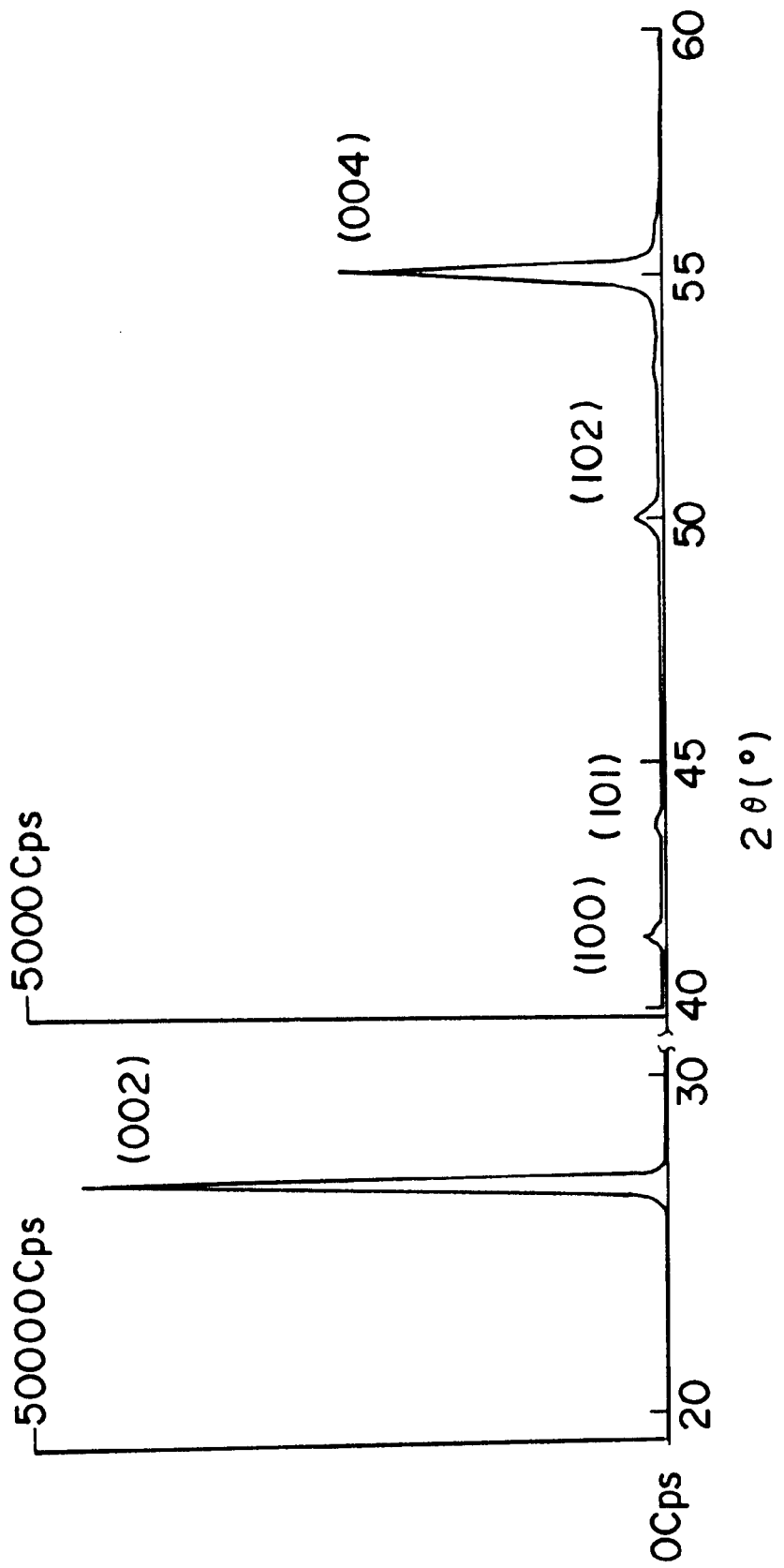
FIG. 13 is an X-ray diffraction chart of a commercial h-BN of Comparative Example B1.
Figure 14:
FIG. 14 is a SEM photograph of the commercial h-BN of Comparative Example B1.
Figure 15:
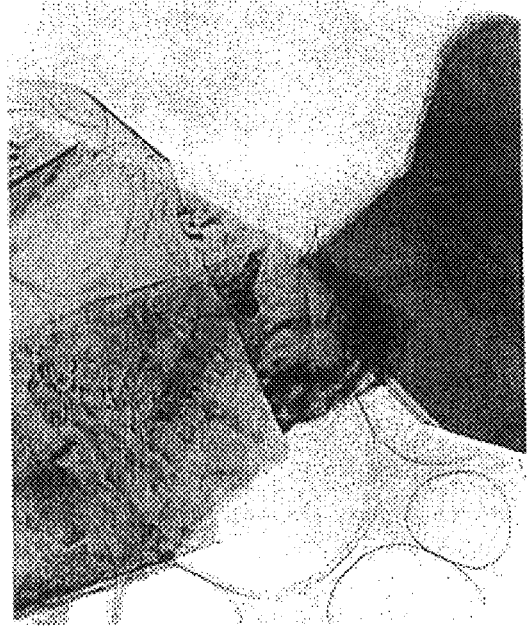
FIG. 15 is a TEM photograph of the commercial h-BN of Comparative Example B1.

A commercial h-BN (GP grade, product of Denki Kagaku Kogyo K.K.) was checked by X-ray diffraction and observed under SEM and TEM to find that although having high crystallinity, the commercial product was in the form of scalelike particles having a mean particle size of 3 to 5 µm, FIG. 13 is an X-ray diffraction chart, FIG. 14 is a SEM photograph, and FIG. 15 is a TEM photograph.

Comparative Example B2

Figure 16:
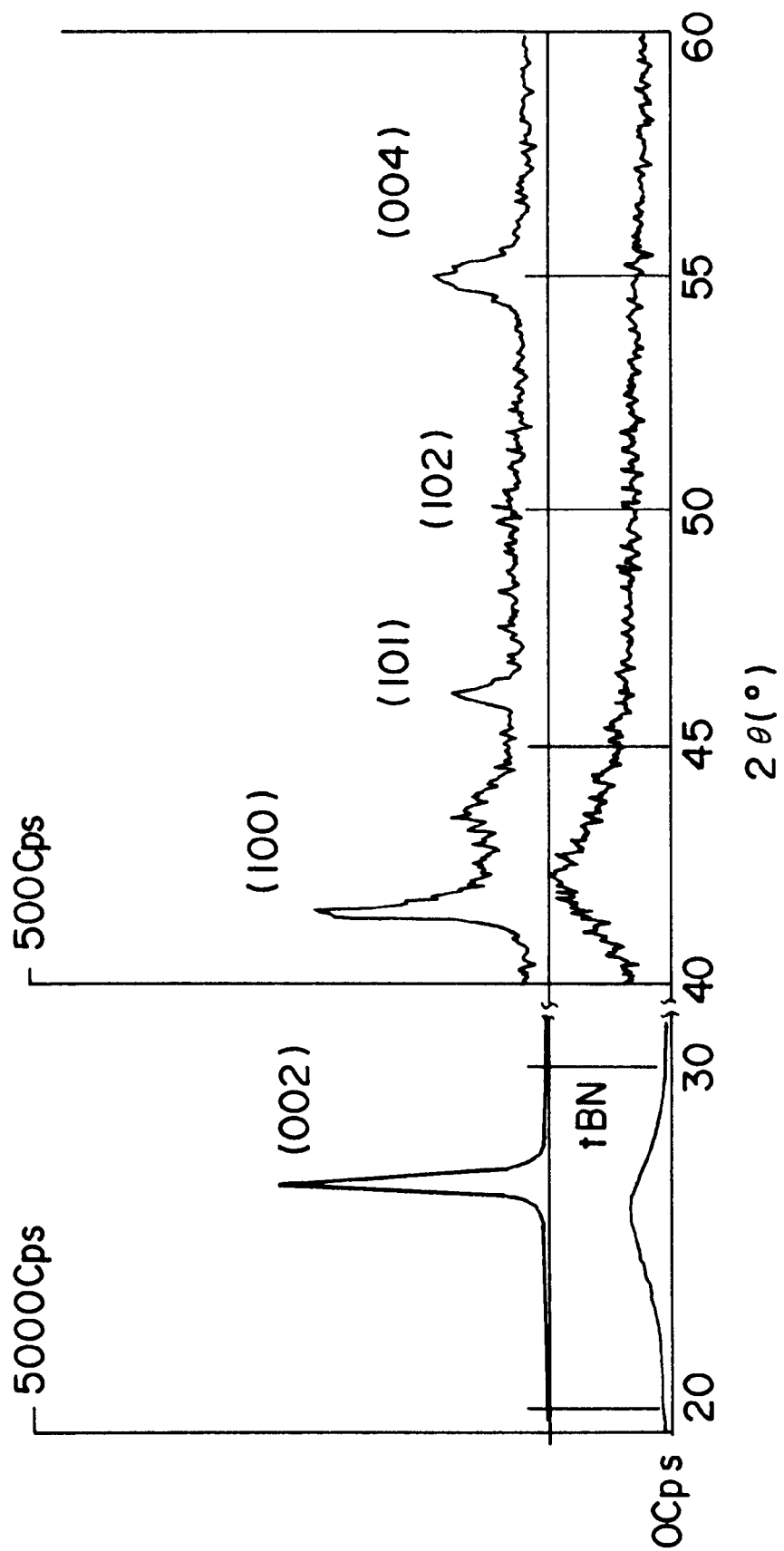
FIG. 16 is an X-ray diffraction chart of a t-BN obtained in Comparative Example B2.
Figure 17:
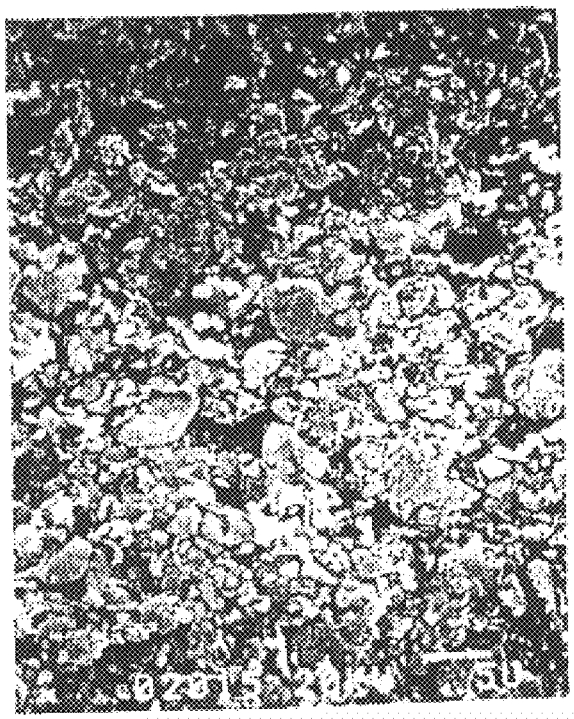
FIG. 17 is a SEM photograph of the t-BN obtained in Comparative Example B2.
Figure 18:
FIG. 18 is a SEM photograph of a h-BN obtained in Comparative Example B2.

Melamine and orthoboric acid were mixed together in a weight ratio of 1:1, heat-treated in a nitrogen atmosphere at 120° C. for 2 hours, allowed to cool and thereafter washed with and dried in hot water. The compound obtained had a purity of 88 wt. %, and was found to be nonuniform scalelike white 0.3 to 3 μm particles by the SEM photograph of FIG. 17. The result of X-ray diffraction shown in FIG. 16 indicated that the compound was a t-BN (so-called crude h-BN) of low crystallinity. No (102) plane peak appeared, the (002) plane peak was 3.35 Å, and the crystallite size Lc was 50 Å. When the powder and $KBO_2$ were subsequently heated at 1200° C. in a nitrogen atmosphere, the product was found to be an h-BN by X-ray diffraction. The SEM photograph of FIG. 18 revealed that the product was in the form of scalelike particles, 3 to 5 μm in mean size.

Comparative Example B3

The h-BN powder obtained in Comparative Example B1 and serving as a filler was mixed with PPS (polyphenylene sulfide) resin in a Henschel mixer for 3 minutes, and the mixture was thereafter kneaded for experiment by a kneader-extruder (300° C., 60 rpm) having two screws 30 mm in diameter and rotatable in the same direction. Consequently, it was found possible to incorporate the filler into the resin with a volume fraction of up to 40 wt. %, but higher volume fractions were not attainable. When checked by the laser flash method, the sample obtained with the volume fraction of 40 wt. % was 1.5 W/m·K in thermal conductivity.

EXAMPLE C1

Figure 19:
FIG. 19 is a SEM photograph showing the shape of a fibrous precursor compound obtained in Example C1.
Figure 20:
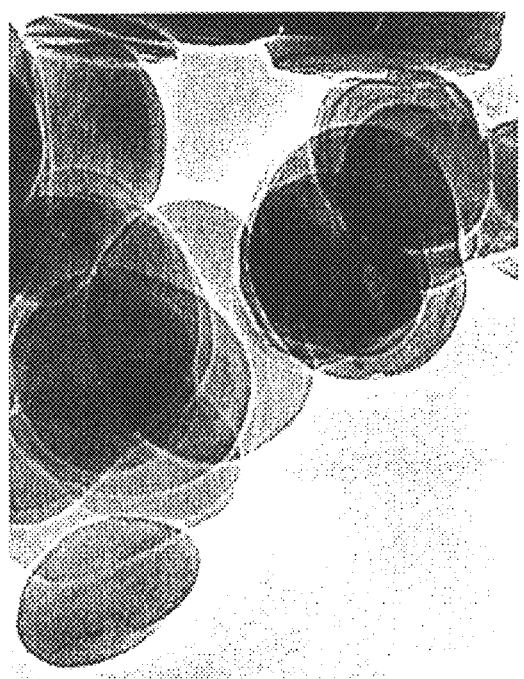
FIG. 20 is a TEM photograph showing the shape of an h-BN powder of the invention obtained in Example C1.
Figure 21:
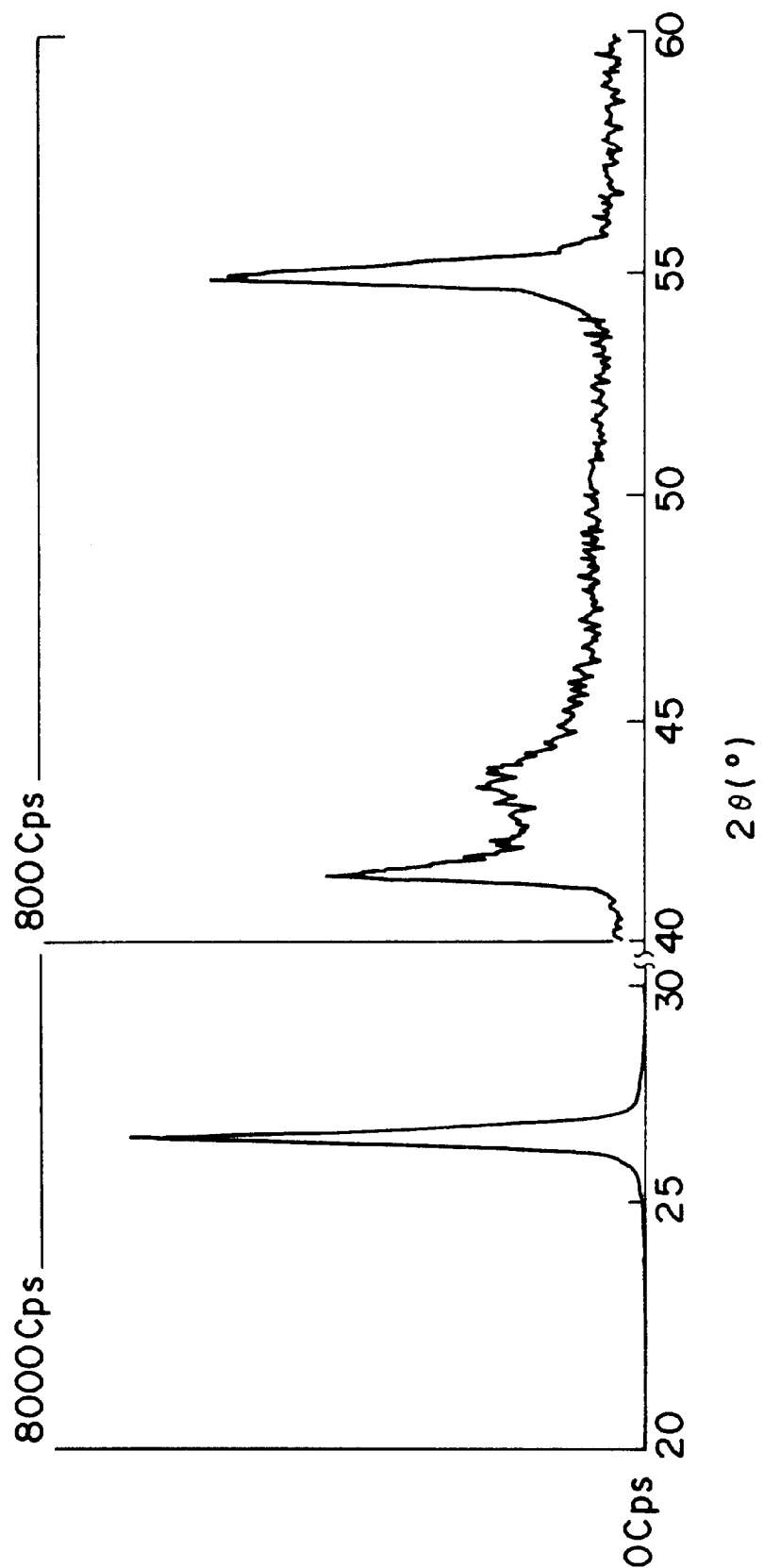
FIG. 21 is an XRD chart of the h-BN powder obtained in Example C1.
Figure 22:
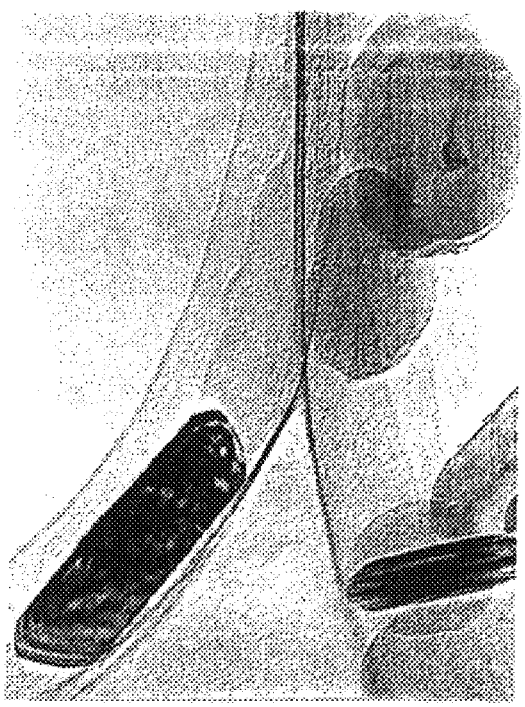
FIG. 22 is a TEM photograph showing the compound obtained in Example C1 as it is seen along the thickness thereof.
Figure 23:
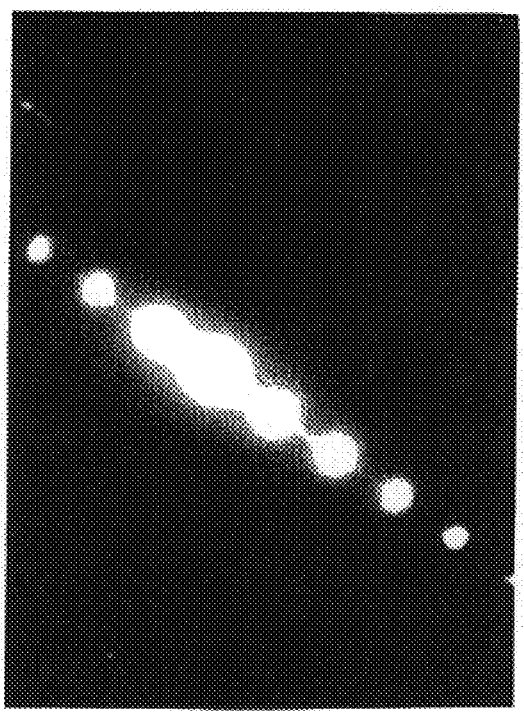
FIG. 23 is an electron beam diffraction photograph showing the stacked layers of the compound obtained in Example C1.

A 400-ml quantity of deionized water was placed into a 500-ml glass beaker, 12 g of melamine was further placed in, and the mixture was heated to 80° C. with stirring to prepare a complete solution. Orthoboric acid (15 g) was uniformly dissolved in the solution for reaction, followed by slow cooling to room temperature to produce a fibrous compound. The compound was filtered off and then dried in a vacuum at 50° C. The fibrous compound was obtained in an amount of 24 g and had an average fiber length of 60 μm. Analyses revealed that the compound had the composition $C_3N_6H_{12}B_2O_6$ wherein two moles of the boric acid was combined with one mole of melamine. The fibrous compound was then heat-treated in a nitrogen atmosphere at 700° C. for 1 hour, cooled and thereafter pulverized in an automatic mortar for 1 hour, followed by a heat treatment in a nitrogen atmosphere at 1400 C. for 1 hour. The resulting product was found to be an h-BN by X-ray diffraction (XRD). An observation under TEM revealed that the product was fine uniform particles in the form of elliptical disks measuring on the average 180 nm in minor axis, 240 nm in major axis and 80 nm in thickness. Further TEM electron beam diffraction indicated that the direction of thickness was the c-axis, namely, that planar reticular hexagonal B-N arrangements were stacked in the direction of thickness. FIG. 19 is a photograph of the fibrous precursor compound taken under a scanning electron microscope (SEM), FIG. 20 is a photograph of the compound obtained, taken under a transmission electron microscope (TEM), and FIG. 21 is an X-ray diffraction (XRD) chart of the same. FIG. 22 is a TEM photograph along the direction of thickness, and FIG. 23 is an electron beam diffraction photograph of the same.

EXAMPLE C2

The precursor compound of the formula $C_3N_6H_{12}B_2O_6$ was prepared by the same reaction as in Example C1, heat-treated in a nitrogen atmosphere at 400° C. for 1 hour, cooled and thereafter pulverized in an automatic mortar for 1 hour, followed by a heat treatment in a nitrogen atmosphere at 1300° C. for 1 hour. The resulting product was in the form of fine disklike primary particles measuring about 120 nm in minor axis, about 150 nm in major axis and about 50 nm in thickness. The result of X-ray diffraction revealed that the product was identical with that of Example C1.

EXAMPLE C3

Turbine oil, #180, having added thereto 5 wt. % of the h-BN in the form of superfine disklike particles and obtained in Example C1 was checked for coefficient of friction by a reciprocating lubrication test under a load of 10 kg at a sliding speed of 1.0 m/min. The coefficient was 0.07 at room temperature and also at 800° C.

Comparative Example C1

Figure 24:
FIG. 24 is a SEM photograph showing the shape of a commercial h-BN of Comparative Example C1.
Figure 25:
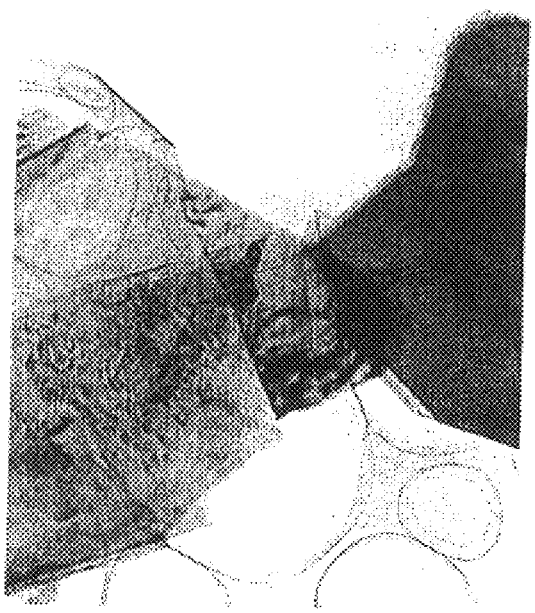
FIG. 25 is a TEM photograph showing the shape of the commercial h-BN of Comparative Example C1.

A commercial h-Bn (GP grade, product of Denki Kagaku Kogyo K.K.) was observed under SEM to find that the nitride was a scalelike h-BN in the form of coarse particles, 3 to 5 μm in size. FIG. 24 shows an SEM photograph of the commercial h-BN, and FIG. 25 a TEM photograph thereof.

Comparative Example C2

Figure 26:
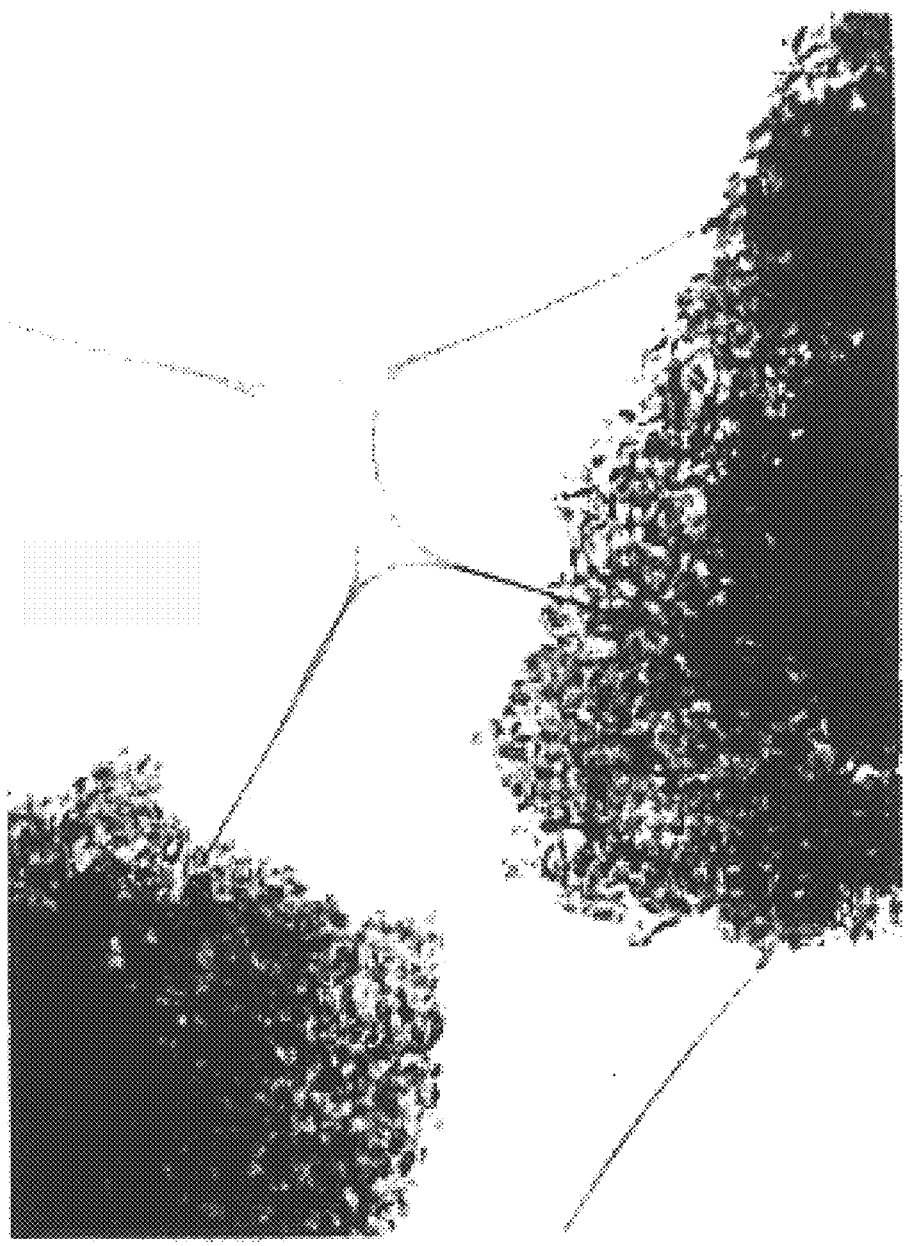
FIG. 26 is a TEM photograph showing the shape of a compound obtained in Comparative Example C2.

A 12 g quantity of melamine and 15 g of orthoboric acid were placed into a 500-ml beaker along with 400 ml of deionized water, followed by stirring at room temperature for 1 hour for reaction and then by filtration and drying at 150° C. The resulting compound was in the form of scales 1 to 5 μm in size. Subsequently, the scalelike compound was heat-treated in a nitrogen atmosphere at 700° C. for 1 hour, cooled, thereafter pulverized in an automatic mortar for 1 hour and heat-treated in a nitrogen atmosphere at 1400° C. for 1 hour. X-ray diffraction showed that the product was an h-BN, which was a mixture of scales and particles, 0.5 to 3 μm in size. FIG. 26 shows a TEM photograph of the product.

Comparative Example C3

Turbine oil, #180, having added thereto 5 wt. % of the scalelike h-BN of Comparative Example C1 was checked for coefficient of friction by a reciprocating lubrication test under a load of 10 kg at a sliding speed of 1.0 m/min. The coefficient was 0.20 at room temperature and also at 800° C.

Industrial Applicability

The first feature of the present invention provides a polycrystalline h-BN compound in the form of fine crystals of the order of nanometers or a polycrystalline h-BN compound which is fibrous in shape and comprises fine crystals of the order of nanometers.

When the compound of the invention is to be made into a composite material, for example, along with a resin and thereby given improved thermal conductivity, the advantage of the compound that it is fibrous achieves an improvement in apparent volume fraction. Further when the compound of the invention is to be used as a material for giving sintered bodies, pulverization of the compound affords primary h-BN particles of the order of nanometers. The compound is industrially useful, for example, because the primary particles are fine crystals of the order of nanometers and accordingly have excellent sinterability.

The second feature of the invention provides a finely crystalline h-BN powder having high purity and high crystallinity, and a convenient and inexpensive process for producing the same.

The use of the present invention is not limited to the examples; the invention produces unprecedented effects also in other uses. For example when used in lubricants, the present compound exhibits higher dispersibility in lubricating oils than the conventional scalelike compound and therefore gives improved lubricating characteristics. The compound of the invention can be sintered easily as mixed with other ceramic particles to afford a ceramic composite material having lubricity imparted thereto. The conventional scalelike h-BN becomes oriented when pressed hot in producing molded articles, whereas the product of the invention is usable for giving isotropic compact molded articles. When used as a material for c-BN, the product can be converted to c-BN at a higher ratio than the conventional scalelike h-BN.

According to the third feature of the invention, because of the melamine-boron arrangement within the acicular precursor compound, planar reticular BN arrangements do not develop in excess of the cross sectional area thereof. When heated at 400 to 800° C. to afford t-BN, the precursor retains its fibrous form without forming a scalelike product. In this stage, the h-BN produced by a reaction in regions of the order of nanometers retains an acicular form with a small bond strength and is therefore very easy to pulverize, affording a uniform fine h-BN powder. It is not a mere amorphous precursor but acicular precursor particles of uniform size that are pulverized as an important requirement of the invention.

Next, the uniform fine t-BN changes into h-BN at a low temperature. Because the transition from t-BN to h-BN is ordering of disturbed layers effected in a group of planar reticular B-N arrangements, the smaller the area of planar reticular arrangements, the easier is the layer-to-layer ordering. Since the particles are fine, the t-BN has an increased surface area and is amenable to an efficient reaction at low temperatures. Because the t-BN is not heated excessively, growth of particles at a high temperature is avoidable to give a fine h-BN powder.

What is claimed is:

1. A fine hexagonal boron nitride powder characterized in that the powder comprises particles in the form of circular disks or elliptical disks having a minor axis La, a major axis Lb and a thickness t which satisfy the following expressions.

$$50 \text{ nm} \leq La \leq Lb \leq 400 \text{ nm}$$

$$20 \text{ nm} \leq t \leq 150 \text{ nm}$$

$$t \leq La$$

$$0.5 \leq La/Lb \leq 1.0.$$

2. A hexagonal boron nitride powder comprising fine particles in the form of elliptical disks or circular disks according to claim 1 which is characterized in that planar reticular hexagonal boron nitride arrangements are stacked in the direction of thickness thereof.

3. A process for producing a hexagonal boron nitride powder comprising fine particles in the form of elliptical disks or circular disks, the process being characterized by heat-treating a fibrous compound containing boron and nitrogen and represented by the formula $C_3N_6H_{12}B_2O_6$ in a nonoxidizing gas atmosphere at a temperature of 400 to 800° C., pulverizing the resulting product and thereafter heattreating the pulverized product in a nonoxidizing gas atmosphere at a temperature of 1000 to 1800° C.

* * * * *